(12) United States Patent
Bajuaifer et al.

(10) Patent No.: US 12,378,481 B2
(45) Date of Patent: Aug. 5, 2025

(54) EMULSION DESTABILIZATION AND GRID CLEANING IN GAS-OIL SEPARATION PLANTS AND SYSTEMS RELATED THERETO

(71) Applicant: SAUDI ARABIAN OIL COMPANY, Dhahran (SA)

(72) Inventors: Hatem Bajuaifer, Dhahran (SA); Ashiff Khan, Dhahran (SA); Khaled N. Mutairi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 172 days.

(21) Appl. No.: 18/352,413

(22) Filed: Jul. 14, 2023

(65) Prior Publication Data

US 2025/0019601 A1  Jan. 16, 2025

(51) Int. Cl.
*C10G 53/02* (2006.01)
*B01D 17/04* (2006.01)
*B01D 19/00* (2006.01)

(52) U.S. Cl.
CPC ........... *C10G 53/02* (2013.01); *B01D 17/045* (2013.01); *B01D 19/0068* (2013.01); *C10G 2300/202* (2013.01)

(58) Field of Classification Search
CPC .. C10G 53/04; C10G 53/02; C10G 2300/201; C10G 2300/4012; C10G 2300/4081
See application file for complete search history.

(56) References Cited

U.S. PATENT DOCUMENTS

2018/0187095 A1* 7/2018 Soliman ................. B03C 11/00

FOREIGN PATENT DOCUMENTS

| CN | 202087243 U | 12/2011 |
|---|---|---|
| CN | 204897839 U | 12/2015 |
| CN | 111647420 A | 9/2020 |

OTHER PUBLICATIONS

Allenson, S. D., Yen, A. T., & Lang, F. (2011). Application of emulsion viscosity reducers to lower produced fluid viscosity. Proceedings of the Annual Offshore Technology Conference, 1, 623-632.

(Continued)

*Primary Examiner* — Randy Boyer
*Assistant Examiner* — Juan C Valencia
(74) *Attorney, Agent, or Firm* — Vorys, Sater, Seymour and Pease LLP

(57) ABSTRACT

Systems and methods including a gas-oil separation plant system including a high pressure production trap (HPPT) separator; a low pressure production trap (LPPT) separator; a dehydrator comprising a plurality of electrical or mechanical dehydrator grids; a desalter comprising a plurality of electrical or mechanical desalter grids; a stabilizer column; wherein a flow pipe interposes the HPPT, LPPT, dehydrator, desalter, and stabilizer column through which an emulsified crude oil is circulated for separation of liquid hydrocarbons and saline water therefrom; and one or more recirculation flowlines for recirculating a stabilized hot crude oil from the stabilizer column to one or more of the HPPT, LPPT, dehydrator, and desalter to (1) reduce or eliminate an amount of demulsifier chemical being introduced into the flow pipe, (2) remove adhered particles from one or both of the dehydrator grids and the desalter grids, or (3) a combination of (1) and (2).

21 Claims, 6 Drawing Sheets

(56) References Cited

OTHER PUBLICATIONS

Alveiro, Y., Garcia, B., Lazaro, I., Samsuri, A., Mat, H., Kokal, S., & Aramco, S. (2005). Crude-Oil Emulsions: A State-Of-The-Art Review Related papers Crude Oil Emulsions—A St at e-Of-T he-Art Review 2 Crude Oil Emulsions—A St at e-Of-T he-Art R . . . Study on demulsifier formulat ion for t reat ing Malaysian crude oil emulsion Crude-Oil Emulsions: A State-Of-The-Art Review.
Chen, G., & Tao, D. (2005). An experimental study of stability of oil-water emulsion. Fuel Processing Technology, 86(5), 499-508.
Langevin, D., Poteau, S., Hénaut, I., & Argillier, J. F. (2004). Crude oil emulsion properties and their application to heavy oil transportation. Oil and Gas Science and Technology, 59(5), 511-521.
Raya, S. A., Mohd Saaid, I., Abbas Ahmed, A., & Abubakar Umar, A. (2020). A critical review of development and demulsification mechanisms of crude oil emulsion in the petroleum industry. Journal of Petroleum Exploration and Production Technology, 10(4), 1711-1728.
Sullivan, A. P., & Kilpatrick, P. K. (2002). The effects of inorganic solid particles on water and crude oil emulsion stability. Industrial and Engineering Chemistry Research, 41(14), 3389-3404.

\* cited by examiner

EMULSION DESTABILIZATION AND GRID CLEANING IN GAS-OIL SEPARATION PLANTS AND SYSTEMS RELATED THERETO

FIELD OF THE DISCLOSURE

The present disclosure generally relates to processing crude oil from oil wells and, more particularly, to systems and methods for emulsion destabilization and online cleaning of dehydrator and desalter equipment grids from emulsions and particles therein in a gas-oil separation plant.

BACKGROUND OF THE DISCLOSURE

Gas-oil separation plant (GOSP) systems are often employed in the upstream oil and gas industry to process raw multiphase crude oil obtained from oil wells. Such raw crude oil includes a mixture of liquid hydrocarbons, gas, and saline (salt) formation water. The main function of GOSP systems is to adequately treat the raw multiphase crude oil by separating the gas and saline formation water from the liquid hydrocarbons to acceptable specifications for effective transportation and downstream processing. For example, excessive salt and water in crude oil can result in high corrosion of transportation pipelines and refining units and can also have detrimental scaling effects on processing units. Furthermore, unstable crude oil can result in high vaporization in transportation pipelines and/or vessels during shipping across regions of high temperature, leading to the potential of catastrophic explosion and major pollution to environment. Accordingly, GOSP systems are instrumental in upstream oil and gas operations and a substantial amount of capital expenditure (CAPEX) and operating expenditure (OPEX) is dedicated to such systems.

The liquid hydrocarbons and saline formation water within the raw crude oil often form emulsions. Emulsions result from the mixing of two immiscible liquids. One of the liquids, the dispersed phase, is distributed as droplets in the other liquid, the continuous phase; here, the liquid hydrocarbons form the continuous phase and the saline water forms the dispersed phase, termed a "water-in-oil emulsion." Accordingly, in order to successfully separate the liquid hydrocarbons from the saline water, the emulsion must be destabilized as part of the GOSP system. Moreover, these water-in-oil emulsions can create a number of operational problems associated with the GOSP system, including, among other issues, tripping of equipment, plant instability, production of off-specification crude, and high pressure drops in flowlines. Therefore, these water-in-oil emulsions must be destabilized to separate the liquid hydrocarbons and the saline water, which typically involves the use of demulsifiers and fresh wash water to achieve required specifications. For example, produced crude oil from most GOSPs must meet basic sediment and water (BS&W) specifications of 0.2 v/v % and salt content of less than 10 pounds per thousand barrels (PTB) (SALT specifications) to be acceptable for most international crude buyers. However, demulsifier chemicals can be quite expensive, particularly depending upon operational conditions (e.g., tightness of the water-in-oil emulsions, temperature, and the like).

GOSP systems include various equipment, as described hereinbelow, including dehydrator and desalter equipment. Dehydrators and desalters may include a plurality (at least two) horizontal mechanical and/or electrical grids (collectively "grids") that serve as coalescers through which the emulsions described above flow within a GOSP system. Mechanical grids agitate (vibrate) to coalesce water droplets and provide water separation and salt separation from hydrocarbons, whereas electrical grids apply an electrostatic field (e.g., up to about 26,000 volts) to achieve the same result. However, the emulsions may adhere ("stick") to the grids and, moreover, any solids present within the emulsions may adhere to the grids. Such adherence can result in interference to the proper or efficient operation of dehydrator and desalter equipment; for example, in the case of electrical grids, adherence of such emulsion particles can electrically short the grids. Thus, such adherence can result in off-specification hydrocarbon product (i.e., failure to meet BS&W and/or SALT specifications). Currently, these grids are typically cleaned by ceasing operations of the GOSP system and opening the equipment to manually clean the grids. Accordingly, the plant incurs economical costs related to ceasing operations and personnel costs associated with manual cleaning and potential hazards related thereto. Another, although less frequently used, current cleaning operation includes continuously running water or other chemicals through the GOSP system, which is also associated with economical costs related to running the GOSP system without producing any hydrocarbon product.

In view of the foregoing, there is a need to both supplement or replace the use of costly demulsifier chemicals while meeting the industry specifications of BS&W and SALT and to replace current costly dehydrator and desalter grids cleaning operations with an online process that ensure industry specifications of BS&W and SALT are not compromised.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a gas-oil separation plant system is provided. The system includes: a high pressure production trap (HPPT) separator; a low pressure production trap (LPPT) separator in fluid communication with the HPPT separator; a dehydrator in fluid communication with the LPPT separator, the dehydrator comprising a plurality of electrical or mechanical dehydrator coalescing grids; a desalter in fluid communication with the dehydrator, the desalter comprising a plurality of electrical or mechanical desalter coalescing grids; a stabilizer column in fluid communication with the desalter; wherein a flow pipe interposes the HPPT separator, the LPPT separator, the dehydrator, the desalter, and the stabilizer column through which an emulsified crude oil is circulated for separation of liquid hydrocarbons and saline water therefrom; and one or more recirculation flowlines for recirculating a stabilized hot crude oil from the stabilizer column to one or more of the HPPT separator, the LPPT separator, the dehydrator, and the desalter to (1) reduce or eliminate an amount of demulsifier chemical being introduced into the flow pipe, (2) remove adhered particles from one or both of the dehydrator coalescing grids and the desalter coalescing grids, or (3) a combination of (1) and (2).

In another embodiment, a method is provided using a gas-oil separation plant system. The method includes: providing a gas-oil separation plant system comprising: a high pressure production trap (HPPT) separator; a low pressure production trap (LPPT) separator in fluid communication with the HPPT separator; a dehydrator in fluid communication with the LPPT separator; a desalter in fluid communication with the dehydrator; a stabilizer column in fluid communication with the desalter; wherein a flowline interposes the LPPT separator and the dehydrator for introduction of a demulsifier chemical to the dehydrator, and wherein an emulsified crude is circulated between the HPPT separator, the LPPT separator, the dehydrator, the desalter, and the stabilizer column for separation of liquid hydrocarbons and saline water therefrom; and one or more recirculation flowlines for recirculating the emulsified crude or liquid hydrocarbons between one or more of the HPPT separator, the LPPT separator, the dehydrator, the desalter, and the stabilizer column to reduce or eliminate an amount of demulsifier chemical being introduced from the demulsifier flowline; and recirculating the emulsified crude or liquid hydrocarbons between one or more of the HPPT separator, the LPPT separator, the dehydrator, the desalter, and the stabilizer column within the one or more recirculation flowlines.

Any combination of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
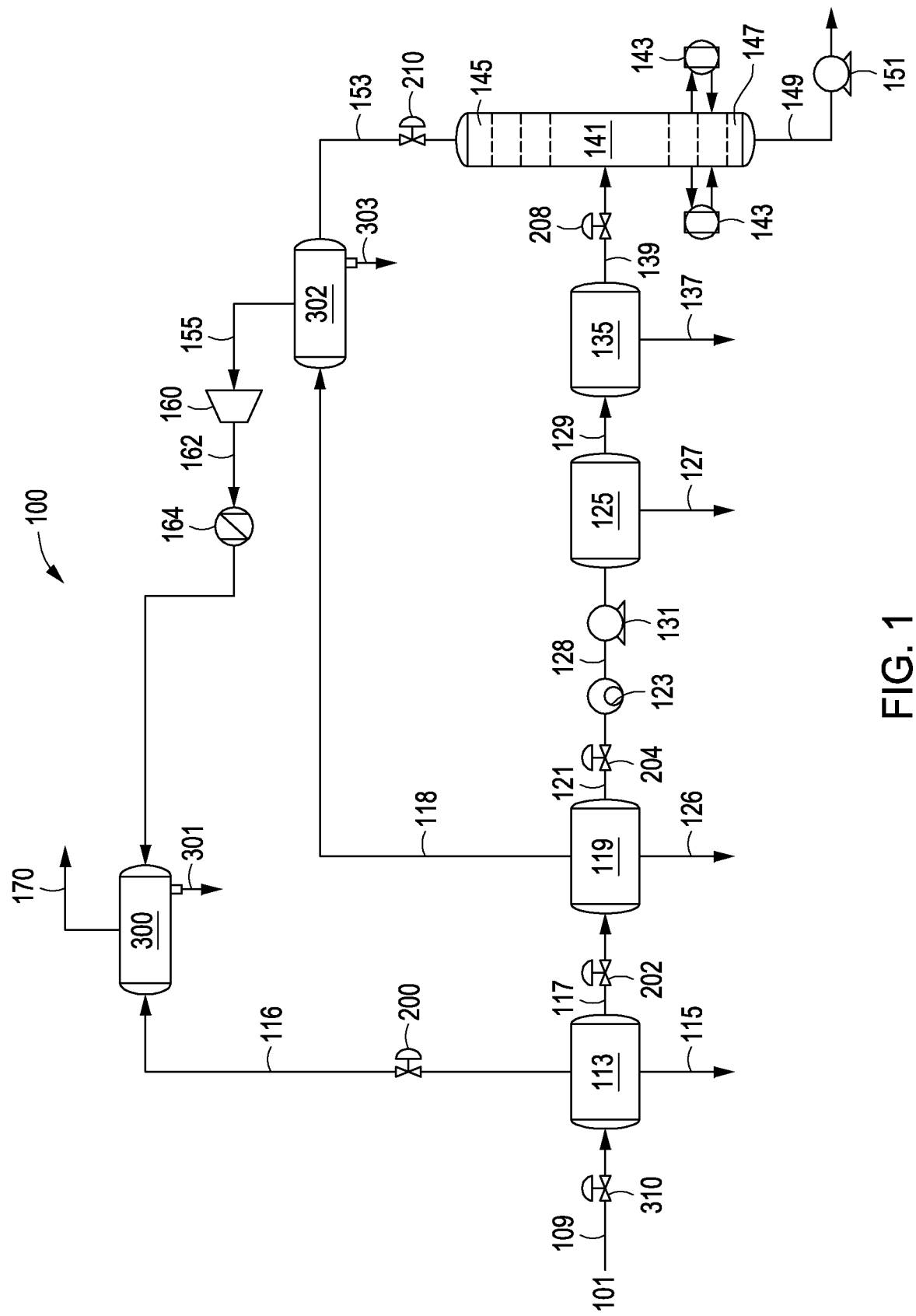
FIG. 1 is a simplified, schematic diagram of a conventional (prior art) GOSP system.

The present disclosure generally relates to processing crude oil from oil wells and, more particularly, to systems and methods for emulsion destabilization and online cleaning of dehydrator and desalter equipment grids from emulsions and particles therein in a gas-oil separation plant.

As described above, emulsion destabilization of raw crude oil to separate liquid hydrocarbons and saline water (water-in-oil emulsion) and cleaning of adhered particles from dehydrator and desalter equipment grids is required as part of a GOSP system, as used herein, the described, modified GOSP system of the present disclosure is termed an emulsion destabilization/cleaning GOSP system or "EDC-GOSP" system. Traditionally, demulsification has been achieved solely with costly demulsifier chemicals (in combination with fresh wash water to reduce the concentration of dissolved salts by dilution) and dehydrator/desalter grids have been generally cleaned by costly and time-consuming manual operations. The EDC-GOSP system of the present disclosure advantageously (1) provides an online mechanism for emulsion destabilization, (2) allows for a reduction or elimination in the amount of demulsifier required in the system, and (3) provides an online cleaning mechanism of dehydrator and desalter grids.

Emulsion destabilization mechanisms include flocculation and coalescence. With regard to water-in-oil emulsions: flocculation refers to the dispersed phase water droplets aggregating (via adhesion), leading to larger droplets and resulting in the larger droplets being squeezed out of the emulsion; coalescence refers to smaller dispersed phase water droplets merging with larger droplets and resulting in eventual phase separation. Methods involved in emulsion destabilization involve thermal, mechanical, electrical, and chemical techniques.

Emulsion behavior is largely controlled by the properties of the adsorbed layers that protect the oil-water surfaces. However, surface tension alone is not sufficient to understand emulsion properties, and surface viscoelasticity plays an important role in a variety of dynamic processes. Indeed, the stability and rheology of emulsions depends on a variety of parameters; such parameters include, but are not to be limited to, viscosity, temperature, density, agitation, and surface forces, each of which themselves are generally interrelated and interact.

For example, emulsions tend to destabilize with decreasing viscosity, increasing temperature, increasing density, increased mechanical agitation (which may be followed by gentle settling), and decreased surface forces (e.g., between dispersed phase droplets).

In further detail, the viscosity of an emulsion is dependent upon a number of factors such as, for instance, the viscosity of the oil component of the emulsion, the viscosity of the water component of the emulsion, the volume fraction of the dispersed water droplets, the water droplet size distribution (e.g., the smaller the droplets, the larger the interfacial surface area for emulsion stability), temperature, shear rate, and amount of associated solids (e.g., the greater the solids, the greater the destabilization).

As an example of the influence of temperature on viscosity, the viscosity of Arabian light crude at temperatures of 130° F.-140° F. (54.4° C.-60° C.) is between 3.3 centipoise (cP) to 4.5 cP, whereas the viscosity of Arabian light crude at temperatures of 170° F.-180° F. (76.7° C.-82.2° C.) is between 1.9 cP to 2.0 cP. As a further example, a decrease in viscosity leads to an increase in flow, thereby mechanically agitating the emulsion and pushing it toward destabilization.

Mechanical methods of emulsion destabilization entail disruption of physical barriers within the emulsion or the application of density variation between the water and oil phases of the emulsion. Upon disruption of these physical barriers (e.g., disruption of surface tension between the dispersed phase and continuous phase), the droplets can coalesce, as described above, thereby reducing surface forces and film stability to form larger droplets that destabilize the emulsion. Coalescence may further result from temperature or electrochemical coagulation of an emulsion due to reduction of the superficial charge of the dispersed phase droplets.

Conventional methods to destabilize emulsions generally take into account only one or a few of the various factors that influence such destabilization. Advantageously, the present disclosure provides an EDC-GOSP system and related methods that take into account the interaction between one, more, or all of viscosity, temperature, density, agitation, and surface forces that influence the stability of an emulsion, thereby enhancing separation of produced crude oil from a GOSP and optimizing the use of chemicals (e.g., demulsifier chemicals). More particularly, the present disclosure describes methods and systems that recycle (recirculate) hot demulsified crude within the EDC-GOSP system back to a High Pressure Production Trap (HPPT) separator, a Low Pressure Production Trap (LPPT) separator, a Wet Crude Handling (WCH) dehydrator, and/or a WCH desalter to provide emulsion destabilization. Advantageously, this hot demulsified crude recycling provides an online mechanism for cleaning emulsions and particles (solids) therein adhered to dehydrator and desalter grids, thereby preventing the need for manual cleaning operations if injected below dehydrator and/or desalter grids. The recycling can be used at continuous rates to achieve necessary BS&W and SALT specifications, or, alternatively, intermittently to clean dehydrator and desalter grids from adhered emulsions and particles therein. It is to be understood that continuous recycling provides both emulsion destabilization and grids cleaning simultaneously.

Embodiments of the present disclosure will be described in detail in some instances with reference to various Figures herein throughout. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

At the outset, both conventional GOSP systems and the EDC-GOSP systems of the present disclosure are described hereinbelow, and both process crude oil. Crude oil produced from various subterranean formations includes a wide boiling mixture of light hydrocarbons (e.g., ethane, propanes, butanes) and heavier hydrocarbons (e.g., pentanes, hexanes, heptanes, octanes, nonanes, at the like, up to gas oils, asphaltenes, and the like). Crude oil is often initially processed in a crude processing plant to remove the light ends and produce a stabilized or unstabilized export crude having little to no light hydrocarbons. For example, a crude processing plant may include a high pressure separator, such as a high pressure production trap operating at about 50 pounds per square inch gauge (psig) to about 150 psig, which may perform an initial separation of the crude, resulting in a high pressure gas stream and a high pressure liquid stream. The pressure of the liquid may then be let down, such as to about 50 psig, or about 30 psig to about 165 psig, encompassing any value and subset therebetween, and separated to form a low-pressure gas stream and a low-pressure liquid stream. A further pressure reduction, such as to less than about 5 psig, or about 0 psig to about 65 psig, encompassing any value and subset therebetween, and separation in a crude stabilizer, such as at low pressure, may result in a low pressure gas stream and a stabilized crude oil product. The temperature of such feed and product streams may vary, and in some embodiments, may range from ambient temperature to about 150° F., encompassing any value and subset therebetween, for example.

Prior Art GOSP System

Before describing the systems and methods for emulsion destabilization and/or grids cleaning in an EDC-GOSP of the present disclosure, a simplified, schematic conventional (prior art) GOSP system 100 is described with reference to FIG. 1. The GOSP system 100 may be configured to receive and process crude oil and, more particularly, to remove hydrocarbon gas and water from the incoming crude oil. A portion of the GOSP system 100 includes a gas compression system (or "gas side") that processes gas as part of the GOSP system 100. The gas compression system of the conventional GOSP system 100 is only partially shown in FIG. 1 and otherwise briefly discussed, as the recirculation of the present disclosure is not performed in the gas compression system portion.

The GOSP system 100 comprises processing equipment and unit operations that will be described in detail; exemplary operating conditions are provided, but other appropriate conditions may be used for the various unit operations. The GOSP 100 receives a crude feed (produced fluid) 101 containing crude oil from production wells in a hydrocarbon-bearing formation. The produced fluid 101 may include crude oil, saline water, natural gas, and other constituents. As used herein, the term "fluid," and grammatical variants thereof, refers to a flowable state of matter including a liquid and gas.

The produced fluid 101 flows into a flow pipe 109 that is in fluid communication with a control valve 310. The produced fluid 101 in the flow pipe 109 may include a high pressure fluid. According to one or more embodiments, a high pressure fluid may have a pressure in the range of from about 140 psig to about 450 psig, encompassing any value and subset therebetween; a low pressure fluid may have a pressure in the range from about 40 psig to about 100 psig, encompassing any value and subset therebetween, and other low pressure fluids may have a pressure in the range of from about 14 psig to about 25 psig, encompassing any value and subset therebetween. The flow pipe 109 directs the high pressure produced fluid 101 into a fluidly coupled high pressure production trap (HPPT) 113.

The HPPT 113 may be configured to separate water or liquid from the produced fluid. The separated water or liquid may be removed from the HPPT 113 through flow pipe 115 in fluid communication with the HPPT 113. The HPPT 113 may be configured to separate high pressure gases from the produced fluid 101, producing a partially degassed crude oil. A decrease in pressure in the HPPT 113 causes lighter hydrocarbon gases in the crude oil to separate from heavier liquid hydrocarbons. Lighter hydrocarbon gases may include C1-C4 hydrocarbons, such as methane, ethane, propane, butane, and iso-butane. Heavier liquid hydrocarbons may include C5 and greater hydrocarbons, such as pentane, iso-pentane, and hexane. According to one or more embodiments, the operating conditions in HPPT 113 include temperatures in the range of from about 65° F. (about 18.3° C.) to about 130° F. (about 54.4° C.), encompassing any value and subset therebetween, and an operating pressure at about 150 psig. The HPPT 113 includes an outlet in fluid communication with a flow pipe 116. The flow pipe 116 may be in fluid communication with a high pressure first stage knock out drum (KOD) 300 (as part of a gas compression system) though a first valve 200. The first stage KOD 300 is configured to operate at a pressure lower than the HPPT 113, such as a pressure in the range of from about 20 psig to about 70 psig, encompassing any value and subset therebetween.

The partially degassed crude oil flows from the HPPT 113 and passes into a flow pipe 117 that is fluidly coupled to a control valve 202. The flow pipe 117 directs the partially degassed crude oil from the HPPT 113 and into a fluidly coupled low-pressure production trap (LPPT) 119. The partially degassed crude oil entering the LPPT 119 from the HPPT 113 may still contain some gas and water. The LPPT 119 may be configured to remove more of the remaining gas and water from the produced fluid 101. The LPPT 119 operates at a lower pressure than the HPPT 113 and separates gases at a low pressure from the partially degassed produced fluid 101. According to one or more embodiments, operating conditions in the LPPT 119 include a temperature ranging from about 65° F. (about 18.3° C.) to about 130° F. (about 54.4° C.), encompassing any value and subset therebetween, and pressure of about 50 psig. The LPPT 119 may have an outlet in fluid communication with another flow pipe 126 configured to remove water or liquid from the partially degassed produced oil 101. The LPPT 119 has an outlet in fluid communication with a flowline 118 to the low pressure compressor KOD 302 (as part of the gas compression system). The low pressure KOD 302 is configured to operate at a pressure lower than the LPPT 119, such as a pressure in the range of from about 1 psig to about 5 psig, encompassing any value and subset therebetween.

The degassed crude oil flows from the LPPT 119 and into a flow pipe 121 that is in fluid communication with a control valve 204, and into a heat exchanger 123. The heat exchanger 123 is configured to transfer heat between the degassed crude oil and another fluid. Heating of the degassed crude oil, and any remaining water or liquid and gas from the LPPT 119, allows for easier separation of water from crude oil in the degassed crude oil. Further, the heating of crude oil in the degassed crude oil improves separation of oil from water by allowing the coalescence of water droplets and settling out of water in the liquid phase, and the heating also encourages removal of gases from the crude oil.

The degassed crude oil containing a heated crude oil stream among other constituents flows from the heat exchanger 123 and into a flow pipe 128 and passes (using pump 131) into a dehydrator 125 with a pressure in the range of about 125 psig to about 175 psig, encompassing any value and subset therebetween. Dehydrator 125 is a separator configured to remove water or liquid from the heated crude oil stream. As described herein, the dehydrator 125 comprises a plurality of grids to facilitate dehydration. The dehydrator 125 may have an outlet in fluid communication with another flow pipe 127 configured to remove water or liquid from the degassed crude oil. According to one or more embodiments, the operating conditions in the dehydrator 125 include temperatures in the range from about 80° F. (about 26.7° C.) to about 160° F. (about 71.1° C.), encompassing any value and subset therebetween, and pressure in the range of from about 125 psig to about 175 psig, encompassing any value and subset therebetween. The heat exchanger 123 and pump 131 may be sufficient to achieve the inlet conditions required by the dehydrator 125.

The dehydrated crude oil stream is passed from the dehydrator 125 to a flow pipe 129. The dehydrated crude oil stream is then passed into a desalter 135 in fluid communication with the flow pipe 129. The dehydrated crude oil may include water and brine that occur naturally or injected during secondary oil recovery operations. The desalter 135 is configured to remove water and salt from the dehydrated crude oil stream to increase the separation of water from the oil. The desalter 135 has an outlet in fluid communication with another flow pipe 137 configured to receive removed water or liquid from the desalter 135. According to one or more embodiments, the operating conditions in the desalter 135 may include a temperature in the range of from about 150° F. (about 65.6° C.) to about 180° F. (about 82.2° C.), encompassing any value and subset therebetween.

The dehydrated and desalted crude oil passes from desalter 135 and into a flow pipe 139 in fluid communication therewith. The flow pipe 139 is in fluid communication with a control valve 208 that passes the dehydrated and desalted crude oil into stabilizer column 141 in fluid communication therewith. The stabilizer 141 may contain multiple stabilizer trays where crude oil flows down each tray until the crude oil reaches a draw-off stabilizer tray. The stabilizer 141 may be in fluid communication with one or more reboilers 143 (two shown). The one or more reboilers 143 may be configured to heat dry crude oil from a tray and return it to the stabilizer 141.

The stabilizer 141 is configured for sweetening and stabilization of the crude oil. In the sweetening process, dissolved hydrogen sulfide (H2S) gas from crude oil is removed. In the stabilization process, heat is used to remove light components that may include any remaining dissolved gases, volatile hydrocarbons, and H2S. Sweetening and stabilization cause the crude oil in the stabilizer 141 to separate into two components: atmospheric gas that may be collected at a top section 145 of the stabilizer 141 and sweetened and stabilized crude oil that may collect at a bottom section 147.

The stabilized crude oil in the stabilizer 141 may pass from that stabilizer 141 into a flow pipe 149 in fluid communication therewith. The flow pipe 149 is in fluid communication with a pump 151 that sends the stabilized crude for shipping and sale. The light components in the crude oil that have vaporized and risen through the top section 145 of stabilizer 141 are passed to a flow pipe 153 in fluid communication therewith to the low pressure compressor KOD 302 (gas compression system) through a control valve 210.

As part of the gas compression system of the GOSP system 100, the low pressure compressor KOD 302 may be configured to separate the gas in the vaporized hydrocarbon in flow pipe 153 into a water or liquid stream 303 and a first overhead hydrocarbon stream 155. The first overhead hydrocarbon stream 155 is fed to a low pressure compressor 160 which may be configured to increase the pressure of the hydrocarbon stream 155, producing a pressurized first overhead hydrocarbon stream 162. The pressurized first overhead hydrocarbon stream 162 may then be fed to a low pressure after-cooler 164 configured to reduce the temperature of the pressurized first overhead hydrocarbon stream 162. The cooled, pressurized first overhead hydrocarbon stream 162 may then be fed to the high pressure first stage KOD 300 from the after-cooler 164.

The high pressure first stage KOD 300 may be configured to reduce the pressure of hydrocarbons in the cooled, pressurized first overhead hydrocarbon stream 162 and hydrocarbons in flowline 116, producing a water or liquid stream 301 and a second overhead hydrocarbon stream 170.

Additional equipment further treats the second overhead hydrocarbon stream 170 briefly described herein (not shown in FIG. 1). The second overhead hydrocarbon stream 170 may flow through a flow pipe through various equipment including, but not limited to, a first high pressure compressor, a high pressure after-cooler, and a high pressure second stage KOD. The high pressure second stage KOD may be configured to reduce the pressure of hydrocarbons in the cooled, pressurized second overhead hydrocarbon stream 170, producing a water or liquid stream and a third overhead hydrocarbon stream. The third overhead hydrocarbon stream may flow through a flow pipe through various additional equipment including, but not limited to, a second high pressure compressor, a second high pressure after-cooler, and a discharge KOD, resulting in a discharge condensate hydrocarbon stream that is taken as produce natural gas liquid (NGL) condensate fed to one or more downstream gas trains.

Accordingly, in conventional GOSP systems, a feed of (wild) crude oil is separated into its gas and liquid phases (oil and water) by stage-wise letting down of the upstream pressure in a series of vessels, recompression of the separated gases in a similar series of compressor stages, and pumping the separated liquid for export to desired destinations. Demulsifier may be injected to contact the crude oil at various locations/stages within the GOSP system, such as prior to introduction to the initial flowline of the GOSP system, or upon exiting the LPPT, or other locations along the flow path of a crude oil in a GOSP system.

Emulsion Destabilization/Cleaning GOSP System (EDC-GOSP System)

The EDC-GOSP systems of the present disclosure provide a number of advantages, as described above. The EDC-GOSP systems include various recirculation flowlines (which may interchangeably be referred to herein as "recycle flowlines") that are not present in conventional GOSP systems and that are designed for emulsion destabilization, thereby permitting a reduction in demulsifier chemical use and associated cost reduction, as well as cost reductions related to other operational problems associated with emulsions within a GOSP system (e.g., equipment tripping, plant instability, production of off-specification crude, high pressure drops in flowlines, and the like). The recirculation flowlines of the present disclosure may further provide a mechanism for dehydrator and/or desalter grids cleaning in case of suspended particles adhered thereon.

The recirculation emulsion destabilization/cleaning (EDC) flowlines as part of the EDC-GOSP systems of the present disclosure include one or more, including all, of the recirculation flowlines described in FIGS. 2A-2E. FIGS. 2A-2E provide recirculation flowlines including: (1) recirculation of stabilized hot crude from a crude stabilizer column back to both an HPPT and an LPPT (see FIG. 2A); (2) recirculation and heating of cold crude from a desalter to both an HPPT and an LPPT (see FIG. 2B); (3) recirculation of stabilized hot crude from a crude stabilizer column back to a dehydrator (see FIG. 2C); (4) recirculation and heating of cold crude from a desalter to a dehydrator (see FIG. 2D); and (5) recirculation of stabilized hot crude from a crude stabilizer column back to both a dehydrator and a desalter (see FIG. 2E).

Each of FIGS. 2A-2E depict an aspect of the EDC-GOSP systems 200 of the present disclosure and are described with reference to FIG. 1, where like references are used and labeled with like labels (numerical references); additional recirculation EDC flowlines are specifically discussed for each of FIGS. 2A-2E. It is to be noted that any combination of two or more, including all, of the recirculation flowlines described in FIGS. 2A-2E may be used to achieve emulsion destabilization, without departing from the scope of the present disclosure. Moreover, while recirculation EDC flowlines are shown as connecting to other flowlines within the EDC-GOSP systems 200, such recirculation EDC flowlines may otherwise be connected to an inlet and/or outlet of the various equipment including the HPPT, LPPT, dehydrator, desalter, and stabilizer.

Figure 2A:
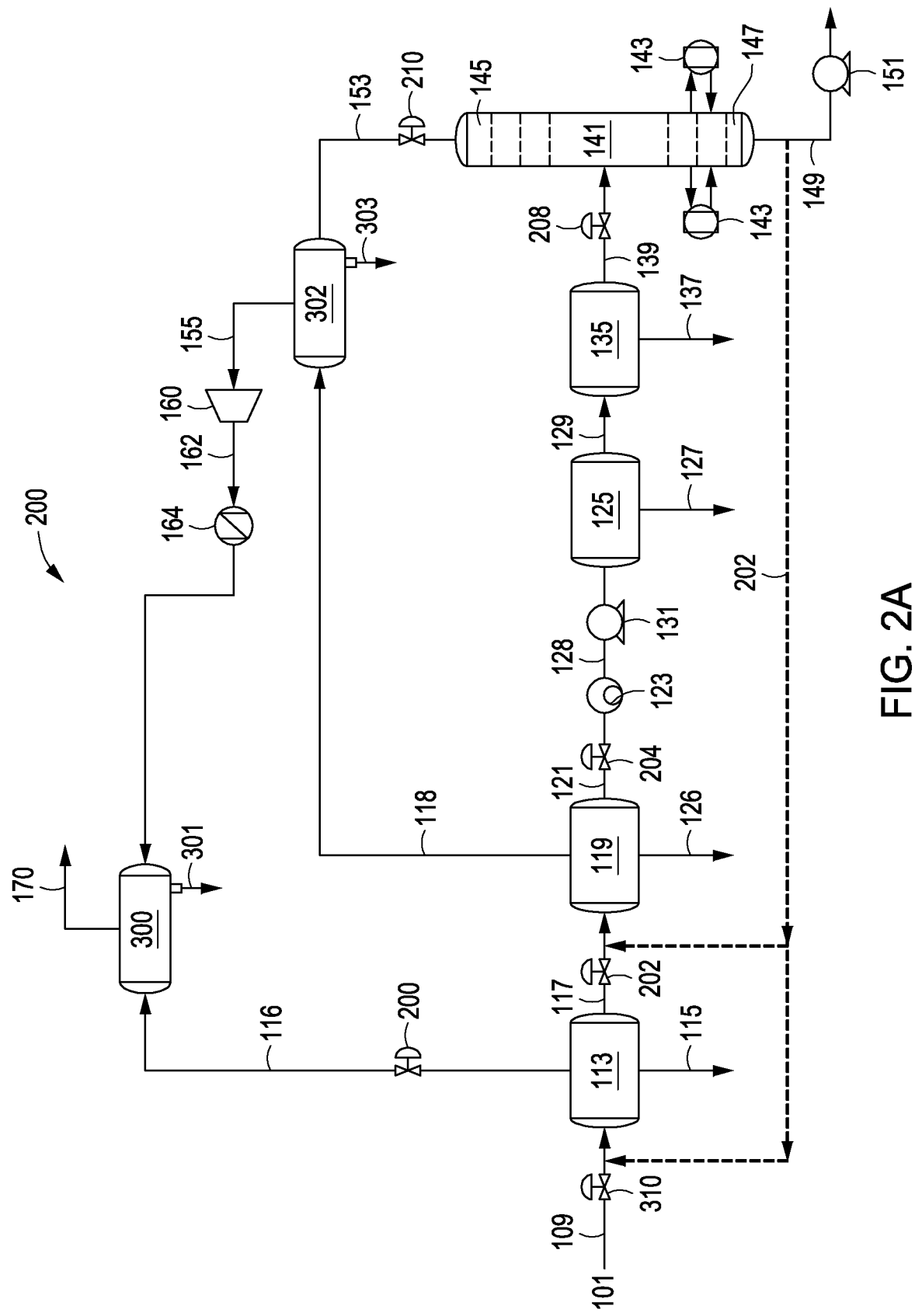
FIGS. 2A-2E are simplified, schematic diagrams of EDC-GOSP systems for recirculating hot crude oil to provide for emulsion destabilization and dehydrator/desalter grid cleaning.

Referring first to FIG. 2A, illustrated is recirculation EDC flowline 202 in which stabilized hot crude oil is removed from flow pipe 149 or an outlet from the bottom section of the stabilizer 141 and recirculated to both the HPPT 113 and the LPPT 119 (via flow pipes 109 and 117, respectively, or an inlet of the HPPT 113 and inlet of the LPPT 119). In so doing, emulsion destabilization of the stabilized hot crude is maximized and a reduction of at least demulsifier chemicals may be realized. It is to be noted that the particular portion of stabilized hot crude oil output from the stabilizer 141 and recirculated to the HPPT 113 and the LPPT 119 may be equal in amount. In other embodiments, a greater amount of the stabilized hot crude oil may be provided to the HPPT 113 and a minority of the stabilized hot crude oil may be provided to the LPPT 119, without departing from the scope of the present disclosure. Alternatively, a greater amount of the stabilized hot crude oil may be provided to the LPPT 119 and a minority of the stabilized hot crude oil may be provided to the HPPT 113, without departing from the scope of the present disclosure. Still yet, all of the stabilized hot crude oil may be provided only to the HPPT 113 or all of the stabilized hot crude may be provided only to the LPPT 119 (e.g., the flowline may be between the stabilizer 141 and only the HPPT 113 or only the LPPT 119), without departing from the scope of the present disclosure. After recirculation (one or more recirculation cycles may be utilized), regardless of the particular amount of stabilized hot crude oil provided to either of the HPPT 113 and/or LPPT 119, the crude oil proceeds back to the stabilizer 141 and final produced export grade crude or stabilized oil is finally pumped by one or more shipper pumps 151 to its export terminal or refinery destination.

With continued reference to FIG. 2A, it is further to be appreciated that the recirculation EDC flowline(s) 202 employed by the embodiment depicted in FIG. 2A may preclude any inclusion of demulsifier into flow pipes described herein (e.g., flow pipe 109 and flow pipe 117), or at least a reduced amount of required demulsifier. In one or more embodiments, if included, the demulsifier concentration may be reduced by an amount in the range of at least greater than about 35 wt. %, such as in the range of about 5 wt. % to about 35 wt. % (or 5 wt. % to 10 wt. %, or 10 wt. % to 15 wt. %, or 15 wt. % to 20 wt. %, or 20 wt. % to 25 wt. %, or 25 wt. % to 30 wt. %, or 30 wt. % to 35 wt. %, or 10 wt. % to 20 wt. %, or 5 wt. % to 20 wt. %, or 20 wt. % to 33 wt. %, or 33 wt. %), encompassing any value and subset therebetween.

Figure 2B:
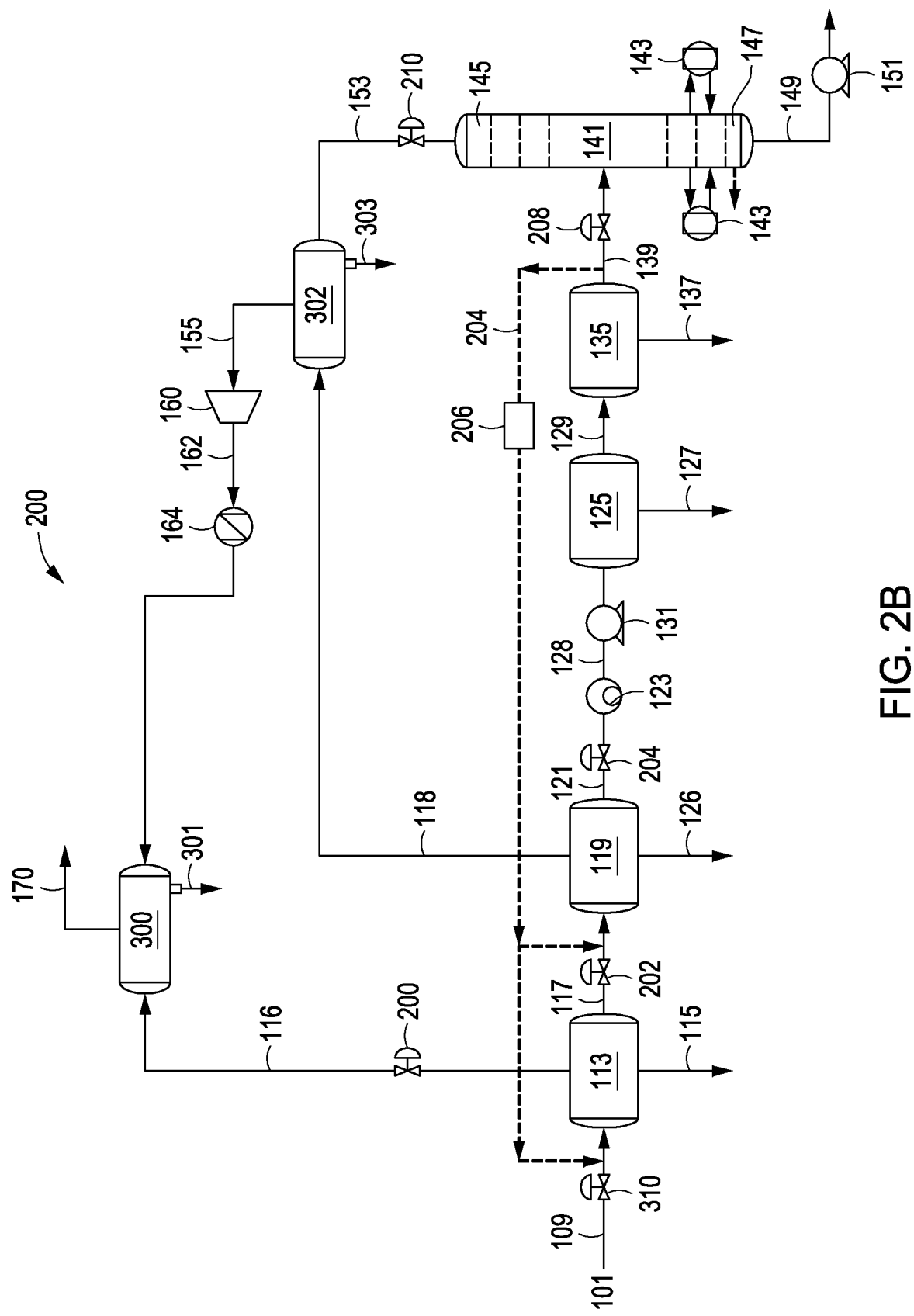

Referring next to FIG. 2B, illustrated is recirculation EDC flowline 204 in which cold crude oil is removed from flow pipe 139 or an outlet of the desalter 135 and recirculated to both the HPPT 113 and the LPPT 119 (via flow pipes 109 and 117, respectively, or an inlet of the HPPT 113 and inlet of the LPPT 119). Prior to recirculation to the HPPT 113 and the LPPT 119, the cold crude oil originating from the desalter 135 is heated by an appropriate heater 206 for receipt by the HPPT 113 and the LPPT 119. The heater 206 may include, but is not limited to, a steam heat exchanger, an external heater, an in-line heater, and the like, and any combination thereof. Recirculation and heating of the cold crude oil from the desalter 135 to the HPPT 113 and the LPPT 119 maximizes emulsion destabilization and thus at least a reduction of demulsifier chemicals may be realized. It is to be noted that the particular portion of cold crude oil output from the desalter 135 and recirculated to the HPPT 113 and the LPPT 119 may be equal in amount. In other embodiments, a greater amount of the cold crude oil output from the desalter 135 may be provided to the HPPT 113 and a minority of the cold crude oil output from the desalter 135 may be provided to the LPPT 119, without departing from the scope of the present disclosure. Alternatively, a greater amount of the cold crude oil output from the desalter 135 may be provided to the LPPT 119 and a minority of the cold crude oil output from the desalter 135 may be provided to the HPPT 113, without departing from the scope of the present disclosure. Still yet, all of the cold crude oil output from the desalter 135 may be provided only to the HPPT 113 or all of the cold crude oil output from the desalter 135 may be provided only to the LPPT 119 (e.g., the flowline 204 may be between the desalter 135 and only the HPPT 113 or only the LPPT 119), without departing from the scope of the present disclosure. After recirculation (one or more recirculation cycles may be utilized), regardless of the particular amount of cold crude oil output from the desalter 135 provided to either of the HPPT 113 and/or LPPT 119, the crude oil proceeds back to the stabilizer 141 and final produced export grade crude or stabilized oil is finally pumped by one or more shipper pumps 151 to its export terminal or refinery destination.

With continued reference to FIG. 2B, it is further to be appreciated that the recirculation EDC flowline(s) 204 employed by the embodiment depicted in FIG. 2B may preclude any inclusion of demulsifier into flow pipes described herein (e.g., flow pipe 109 and flow pipe 117), or at least a reduced amount of required demulsifier. In one or more embodiments, if included, the demulsifier concentration may be reduced by an amount in the range of at least greater than about 35 wt. %, such as in the range of about 5 wt. % to about 35 wt. % (or 5 wt. % to 10 wt. %, or 10 wt. % to 15 wt. %, or 15 wt. % to 20 wt. %, or 20 wt. % to 25 wt. %, or 25 wt. % to 30 wt. %, or 30 wt. % to 35 wt. %, or 10 wt. % to 20 wt. %, or 5 wt. % to 20 wt. %, or 20 wt. % to 33 wt. %, or 33 wt. %), encompassing any value and subset therebetween.

Figure 2C:
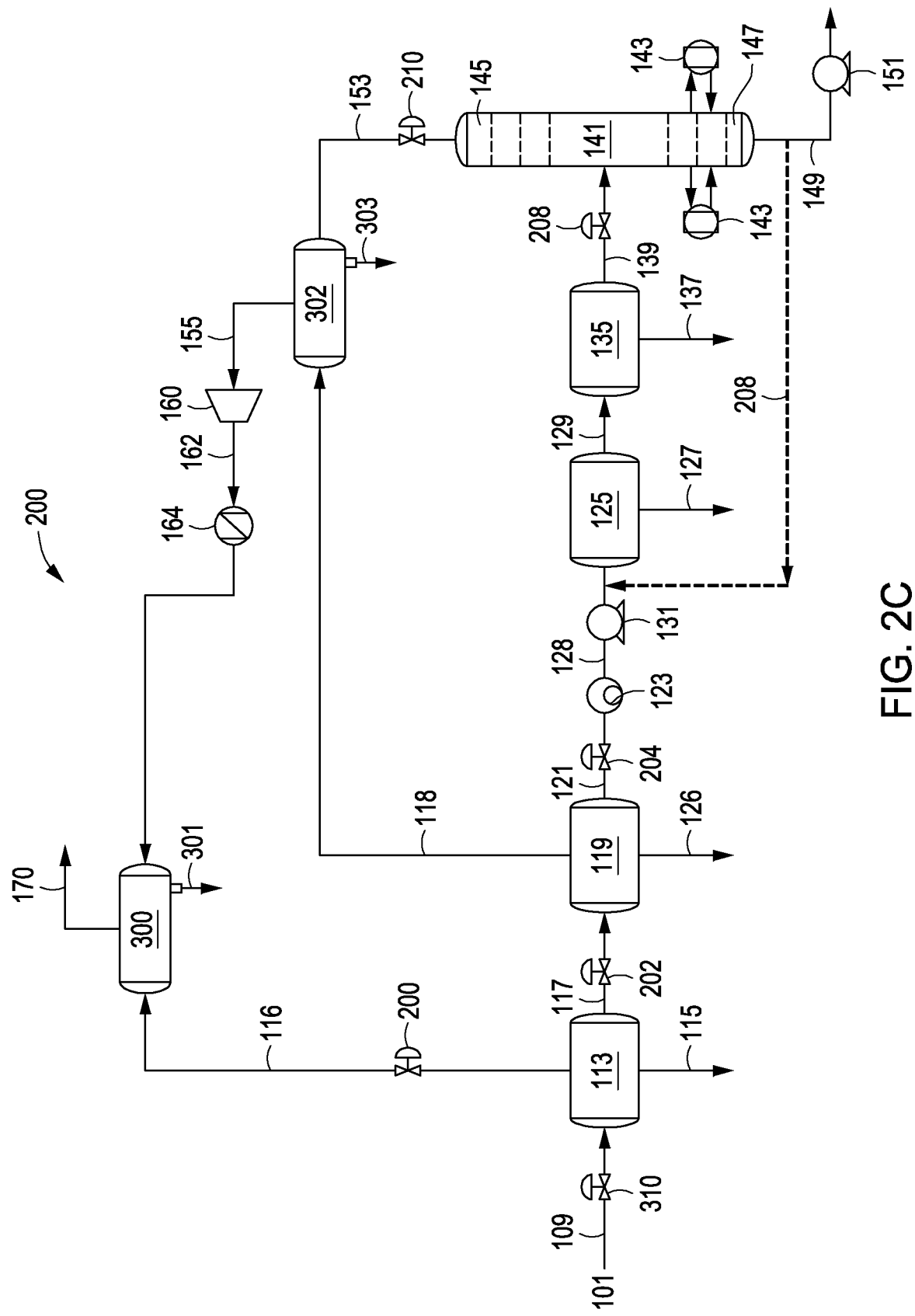

Referring now to FIG. 2C, illustrated is recirculation EDC flowline 208 in which stabilized hot crude oil is removed from flow pipe 149 or an outlet in the bottom section 147 of the stabilizer 141 and recirculated to the dehydrator 125 (e.g., via flow pipe 128 or an inlet of the dehydrator 125. In so doing, emulsion destabilization is maximized and a reduction of at least demulsifier chemicals may be realized. Moreover, recirculation of the stabilized hot crude from the stabilizer 141 to the dehydrator 125 provides for cleaning of adhered particles from the internal grids of the dehydrator 125, where such occurrence has occurred as a result of circulated emulsions and particulates therein (as part of the crude oil), if any, as described hereinabove. After recirculation (one or more recirculation cycles may be utilized), the crude oil proceeds back to the stabilizer 141 and final produced export grade crude or stabilized oil is finally pumped by one or more shipper pumps 151 to its export terminal or refinery destination.

With continued reference to FIG. 2C, it is further to be appreciated that the recirculation EDC flowline(s) 208 employed by the embodiment depicted in FIG. 2C may preclude any inclusion of demulsifier (e.g., at flow pipe 108, flow pipe 117, flow pipe 121, and/or flow pipe 128), or at least a reduced amount of required demulsifier. In one or more embodiments, if included, the demulsifier concentration 64 may be reduced by an amount in the range of at least greater than about 35 wt. %, such as in the range of about 5 wt. % to about 35 wt. % (or 5 wt. % to 10 wt. %, or 10 wt. % to 15 wt. %, or 15 wt. % to 20 wt. %, or 20 wt. % to 25 wt. %, or 25 wt. % to 30 wt. %, or 30 wt. % to 35 wt. %, or 10 wt. % to 20 wt. %, or 5 wt. % to 20 wt. %, or 20 wt. % to 33 wt. %, or 33 wt. %), encompassing any value and subset therebetween.

Figure 2D:
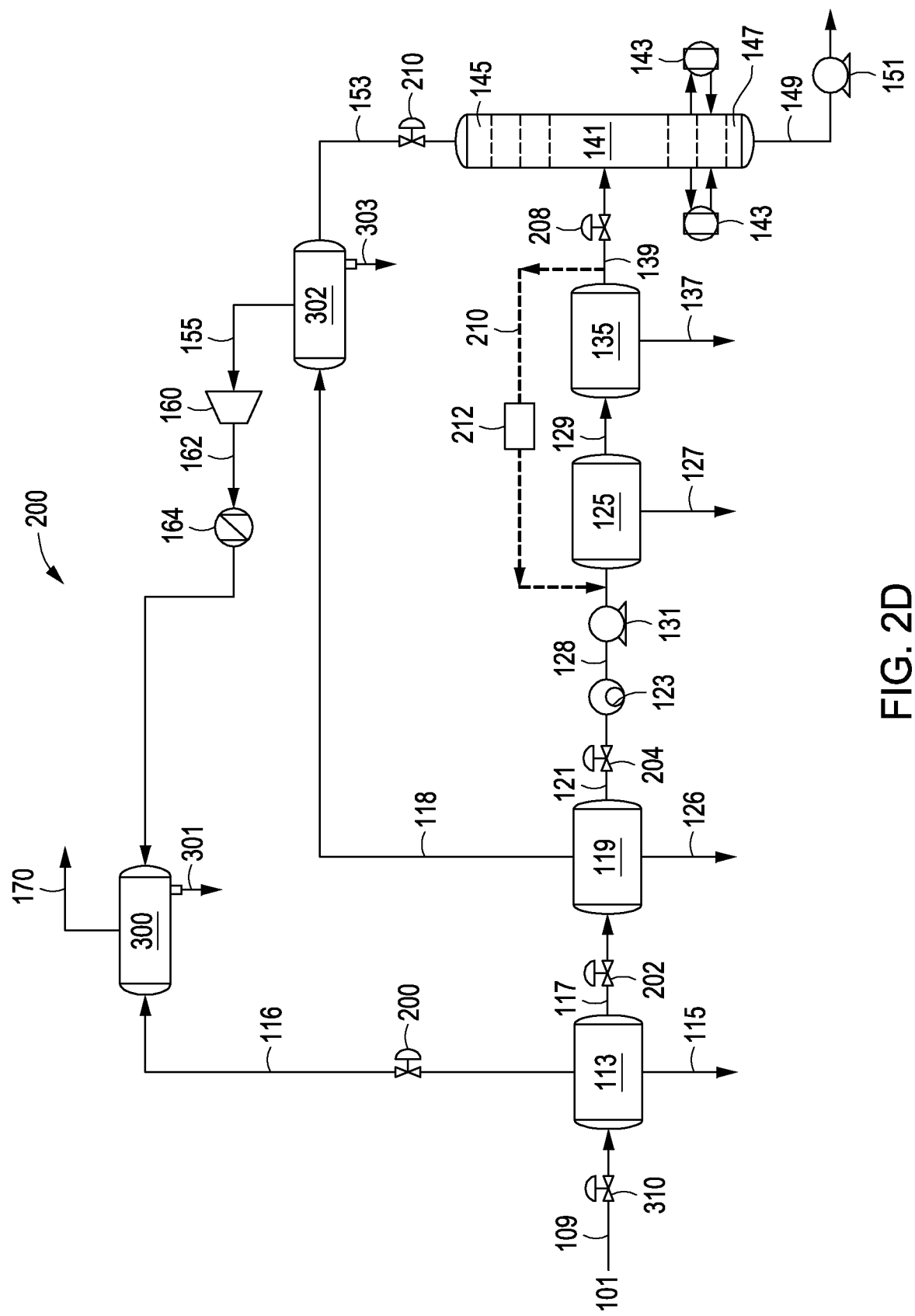

Referring first to FIG. 2D, illustrated is recirculation EDC flowline 210 in which cold crude oil is removed from flow pipe 139 or an outlet of the desalter 135 and recirculated to the dehydrator 125 (e.g., via flow pipe 128 or an inlet to the dehydrator 125). Prior to recirculation to the dehydrator 125, the cold crude oil originating from the desalter 135 is heated by an appropriate heater 212 for receipt by the dehydrator 125. The heater 212 may include, but is not limited to, a steam heat exchanger, an external heater, an in-line heater, and the like, and any combination thereof. Recirculation and heating of the cold crude oil from the desalter 135 to the dehydrator 125 maximizes emulsion destabilization and thus at least a reduction of demulsifier chemicals may be realized. Moreover, heated cold crude from the desalter 135 to the dehydrator 125 provides for cleaning of adhered particles from the internal grids of the dehydrator 125, where such occurrence has occurred as a result of circulated emulsions and particulates therein (as part of the crude oil), if any, as described hereinabove. After recirculation (one or more recirculation cycles may be utilized), the crude oil proceeds back to the stabilizer 141 and final produced export grade crude or stabilized oil is finally pumped by one or more shipper pumps 151 to its export terminal or refinery destination.

With continued reference to FIG. 2D, it is further to be appreciated that the recirculation EDC flowline(s) 210 employed by the embodiment depicted in FIG. 2D may preclude any inclusion of demulsifier (e.g., at flow pipe 128), or at least a reduced amount of required demulsifier. In one or more embodiments, if included, the demulsifier concentration may be reduced by an amount in the range of at least greater than about 35 wt. %, such as in the range of about 5 wt. % to about 35 wt. % (or 5 wt. % to 10 wt. %, or 10 wt. % to 15 wt. %, or 15 wt. % to 20 wt. %, or 20 wt. % to 25 wt. %, or 25 wt. % to 30 wt. %, or 30 wt. % to 35 wt. %, or 10 wt. % to 20 wt. %, or 5 wt. % to 20 wt. %, or 20 wt. % to 33 wt. %, or 33 wt. %), encompassing any value and subset therebetween.

Figure 2E:
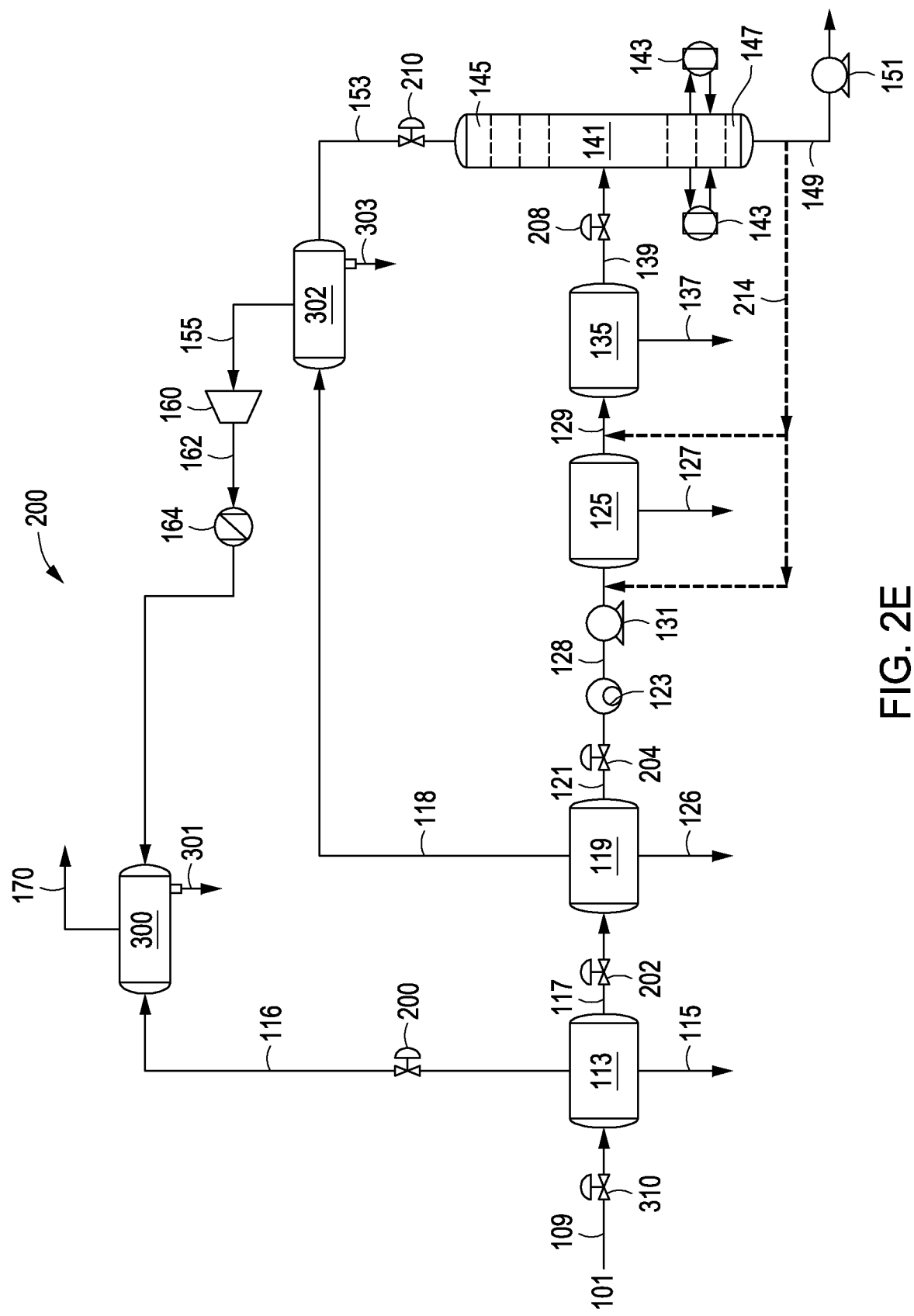

Referring first to FIG. 2E, illustrated is recirculation EDC flowline 214 in which stabilized hot crude oil is removed from flow pipe 149 or an outlet of the stabilizer 141 and recirculated to both the dehydrator 125 and the desalter 135. In so doing, emulsion destabilization is maximized and a reduction of at least demulsifier chemicals may be realized. Moreover, recirculation of the stabilized hot crude from the stabilizer 141 to the dehydrator 125 and desalter 135 provides for cleaning of adhered particles from the internal grids of the dehydrator 125 and desalter 135, where such occurrence has occurred as a result of circulated emulsions and particulates therein (as part of the crude oil), if any, as described hereinabove. It is to be noted that the particular portion of stabilized hot crude oil output from the stabilizer 141 and distributed to the dehydrator 125 and desalter 135 may be equal in amount. In other embodiments, a greater amount of the stabilized hot crude oil may be provided to the dehydrator 125 and a minority of the stabilized hot crude oil may be provided to the desalter 135, without departing from the scope of the present disclosure. Alternatively, a greater amount of the stabilized hot crude oil may be provided to the desalter 135 and a minority of the stabilized hot crude oil may be provided to the dehydrator 125, without departing from the scope of the present disclosure. Still yet, all of the stabilized hot crude oil may be provided only to the dehydrator 125 or all of the stabilized hot crude oil may be provided only to the WCH desalter 135, without departing from the scope of the present disclosure. After recirculation (one or more recirculation cycles may be utilized), regardless of the particular amount of stabilized hot crude oil provided to either of the dehydrator 125 and/or desalter 135, the crude oil proceeds back to the stabilizer 141 and final produced export grade crude or stabilized oil is finally pumped by one or more shipper pumps 151 to its export terminal or refinery destination.

With continued reference to FIG. 2E, it is further to be appreciated that the recirculation EDC flowline(s) 214 employed by the embodiment depicted in FIG. 2E may preclude any inclusion of demulsifier (e.g., via flow pipe 128 and/or flow pipe 129), or at least a reduced amount of required demulsifier. In one or more embodiments, if included, the demulsifier concentration may be reduced by an amount in the range of at least greater than about 35 wt. %, such as in the range of about 5 wt. % to about 35 wt. % (or 5 wt. % to 10 wt. %, or 10 wt. % to 15 wt. %, or 15 wt. % to 20 wt. %, or 20 wt. % to 25 wt. %, or 25 wt. % to 30 wt. %, or 30 wt. % to 35 wt. %, or 10 wt. % to 20 wt. %, or 5 wt. % to 20 wt. %, or 20 wt. % to 33 wt. %, or 33 wt. %), encompassing any value and subset therebetween.

In each of FIGS. 2A-2E, various valves (e.g., FIT with control valves, hand operative valve (HOV), choke valves, and the like, and any combination thereof) which may be manually or electrically (e.g., remotely or locally) operated, for example, to control flow rates of flow within the various recirculation flowlines of the present disclosure. In one or more aspects, one or more valves may be included along recirculation line 202 (see FIG. 2A), recirculation line 204 (see FIG. 2B), recirculation line 208 (see FIG. 2C), recirculation line 210 (see FIG. 2D), and recirculation line 214 (see FIG. 2E). At least one valve for controlling fluid flow rate is provided to each of recirculation line 202 (see FIG. 2A), recirculation line 204 (see FIG. 2B), recirculation line 208 (see FIG. 2C), recirculation line 210 (see FIG. 2D), and recirculation line 214 (see FIG. 2E) to aid in maintaining the produced export grade crude or stabilized oil within required BS&W and SALT specifications. In one or more aspects, an HOV is provided at least outside of the dehydrator 125 and/or the desalter 135.

Recirculation in either one, more, or all of the embodiments of FIGS. 2A-2E may be less than 2% of the crude oil processed by an EDC-GOSP system. In one or more aspects, recirculation may be in the range of about 0.5 thousand barrels of oil per calendar day (MBD) to about 6 MBD (or 0.5 MBD to 1 MBD, or 1 MBD to 2 MBD, or 2 MBD to 3 MBD, or 3 MBD to 4 MBD, or 4 MBD to 5 MBD, or 5 MBD to 6 MBD), encompassing any value and subset therebetween, depending upon the particular capacity of the EDC-GOSP system. For example, a 300 MBD capacity EDC-GOSP may recirculate approximately 6 MBD of crude oil to provide emulsion destabilization, reduce the amount of necessary demulsifier chemicals, and/or provide particulate cleaning to dehydrator 125 grids and/or desalter 135 grids. Moreover, the recirculation may be adjusted at any time during the operation of the EDC-GOSP, without departing from the scope of the present disclosure, including ceasing recirculation of a particular period of time.

As provided above, and with continued reference to FIGS. 2A-2E, demulsifiers may be significantly reduced using one or a combination of the recirculation schemes provided in FIGS. 2A-2E. For example, the demulsifier may be excluded completely or reduced substantially. Moreover, advantageously, and without adjusting the configuration of a conventional GOSP system, demulsifier chemicals may be included "on-the-fly" (that is, as needed) if, for example, the need arises (e.g., based on analyzer readings) to maintain BS&W and SALT specifications.

With continued reference to FIGS. 2A-2E, and in one or more aspects, the recirculation flowline between the stabilizer 141 and dehydrator 125 or desalter 135 (e.g., recirculation flowlines 202, 208, 214), or between the dehydrator 125 and the desalter 135 (e.g., recirculation flowline 210), may have a diameter in the range of about 2 inches (in) to about 6 in (or 2 in to 3 in, or 3 in to 4 in, or 4 in to 5 in, or 5 in to 6 in, or 3 in to 5 in, or 4 in to 6 in), encompassing any value and subset therebetween. Moreover, the recirculation flowline from the stabilizer 141 may be between multiple dehydrators 125 and/or multiple desalters 135, such as three or more such dehydrators 125 and/or desalters 135. Furthermore, where one dehydrator 125 and/or one desalter 135 are included, multiple flow pipes and recirculation flowlines to and from the stabilizer 141, respectively, may be provided, without departing from the scope of the present disclosure. That is, two, three, or more flow pipes and recirculation flowlines may be provided to and from, respectively, the dehydrator 125 and/or the desalter 135.

As provided above, the dehydrator 125 and desalter 135 comprise a plurality of grids that may be electrical grids provided with electrodes for coalescing water droplets and provide water separation and salt separation from hydrocarbons, respectfully. These electrodes are located within the interior of the dehydrator 125 and desalter 135 at various locations along each grid. Recirculation flowlines that encounter the dehydrator 125 and desalter 135 directly (e.g., recirculation flowlines 208, 210, 214) may be in the form of a plurality of interior lines (e.g., two, three, or more interior lines depending on the number of grids) equipped with nozzles to spray or otherwise emit recirculated crude oil onto each interior grid. For example, the interior lines may be located about 50 millimeters (mm) below each of the applicable grids to spray hot crude oil on the grids for online cleaning thereof.

In one or more aspects, the various interior lines described above may include one or more nozzles for emitting the crude oil, such as high pressure nozzles that can control the pressure drop within the interior lines to atomize and spray the stabilized hot crude oil into the dehydrator 125 and/or the desalter 135 grids or atomizing and spraying the desalted crude oil from the desalter 135 into the dehydrator 125 after heating for online cleaning of the grids. For example, there may be approximately 50 nozzles that may be installed approximately 1000 mm apart along the various interior lines. Such nozzles may be installed at particular angles, such as to spray at a 45° angle from the centerline to cover an entire electrode surface.

It is to be noted that any one, more, or all of the recirculation configurations provided in FIGS. 2A-2E are within the scope of the present disclosure, without limitation.

EXAMPLE EMBODIMENTS

Embodiments disclosed herein include:

Embodiment A: A gas-oil separation plant system, the system comprising: a high pressure production trap (HPPT) separator; a low pressure production trap (LPPT) separator in fluid communication with the HPPT separator; a dehydrator in fluid communication with the LPPT separator, the dehydrator comprising a plurality of electrical or mechanical dehydrator coalescing grids; a desalter in fluid communication with the dehydrator, the desalter comprising a plurality of electrical or mechanical desalter coalescing grids; a stabilizer column in fluid communication with the desalter; wherein a flow pipe interposes the HPPT separator, the LPPT separator, the dehydrator, the desalter, and the stabilizer column through which an emulsified crude oil is circulated for separation of liquid hydrocarbons and saline water therefrom; and one or more recirculation flowlines for recirculating a stabilized hot crude oil from the stabilizer column to one or more of the HPPT separator, the LPPT separator, the dehydrator, and the desalter to (1) reduce or eliminate an amount of demulsifier chemical being introduced into the flow pipe, (2) remove adhered particles from one or both of the dehydrator coalescing grids and the desalter coalescing grids, or (3) a combination of (1) and (2).

Embodiment B: A method comprising: providing a gas-oil separation plant system comprising: a high pressure production trap (HPPT) separator; a low pressure production trap (LPPT) separator in fluid communication with the HPPT separator; a dehydrator in fluid communication with the LPPT separator; a desalter in fluid communication with the dehydrator; a stabilizer column in fluid communication with the desalter; wherein a flowline interposes the LPPT separator and the dehydrator for introduction of a demulsifier chemical to the dehydrator, and wherein an emulsified crude is circulated between the HPPT separator, the LPPT separator, the dehydrator, the desalter, and the stabilizer column for separation of liquid hydrocarbons and saline water therefrom; and one or more recirculation flowlines for recirculating the emulsified crude or liquid hydrocarbons between one or more of the HPPT separator, the LPPT separator, the dehydrator, the desalter, and the stabilizer column to reduce or eliminate an amount of demulsifier chemical being introduced from the demulsifier flowline; and recirculating the emulsified crude or liquid hydrocarbons between one or more of the HPPT separator, the LPPT separator, the dehydrator, the desalter, and the stabilizer column within the one or more recirculation flowlines.

Each of Embodiments A and B may have one or more of the following additional elements in any combination:

Element 1: wherein a recirculation flowline extends between the stabilizer column and the HPPT.

Element 2: wherein a recirculation flowline extends between the stabilizer column and the LPPT.

Element 3: wherein a recirculation flowline extends between the stabilizer column and both the HPPT and the LPPT.

Element 4: wherein a recirculation flowline extends between the stabilizer column and the dehydrator.

Element 5: wherein a recirculation flowline extends between the stabilizer column and the desalter.

Element 6: wherein a recirculation flowline extends between the stabilization column and both the dehydrator and the desalter.

Element 7: further comprising an additional recirculation flowline that extends between the desalter and the LPPT for recirculating a desalted cold crude oil from the desalter to the LPPT, and further comprising a heater interposing the desalter and the LPPT for heating contents of the additional recirculation flowline.

Element 8: wherein the dehydrator and the desalter further comprise interior lines under the dehydrator coalescing grids and the desalter coalescing grids, respectively by 50 mm and each include one or more nozzles for emitting recirculated stabilized hot crude oil, wherein the one or more nozzles are high pressure nozzles that control the pressure drop within the interior lines to atomize and spray the recirculated stabilized hot crude oil into the dehydrator and/or the desalter coalescing grids, or to atomize and spray recirculated desalted crude oil from the desalter into the dehydrator after heating with a heater.

Element 9: further comprising an additional recirculation flowline that extends between the desalter and both the HPPT and the LPPT for recirculating a desalted cold crude oil from the desalter to the HPPT and the LPPT, and further comprising a heater interposing the desalter and both the HPPT and the LPPT for heating contents of the additional recirculation flowline.

Element 10: further comprising an additional recirculation flowline that extends between the desalter and the HPPT for recirculating a desalted cold crude oil from the desalter to the HPPT, and further comprising a heater interposing the desalter and the HPPT for heating contents of the additional recirculation flowline.

Element 11: further comprising an additional recirculation flowline that extends between the desalter and the dehydrator, and further comprising a heater interposing the desalter and the dehydrator for heating contents of the additional recirculation flowline.

By way of non-limiting example, exemplary combinations applicable to Embodiments A and B include: any one, more, or all of Elements 1-11, without limitation. That is, as described above, multiple recirculation flowlines may be utilized and may run to and from multiple components of the EDC-GOSP, including redundant recirculation flowlines.

Accordingly, the present disclosure provides EDC-GOSP systems and methods related thereto for recirculating hot or cold crude to provide effective emulsion destabilization.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

What is claimed is:

1. A gas-oil separation plant system, the system comprising:
   a high pressure production trap (HPPT) separator;
   a low pressure production trap (LPPT) separator in fluid communication with the HPPT separator;
   a dehydrator in fluid communication with the LPPT separator, the dehydrator comprising a plurality of electrical or mechanical dehydrator coalescing grids;
   a desalter in fluid communication with the dehydrator, the desalter comprising a plurality of electrical or mechanical desalter coalescing grids;
   a stabilizer column in fluid communication with the desalter;
      wherein a flow pipe interposes the HPPT separator, the LPPT separator, the dehydrator, the desalter, and the stabilizer column through which an emulsified crude oil is circulated for separation of liquid hydrocarbon and saline water therefrom; and
   one or more recirculation flowlines for recirculating a stabilized hot crude oil from the stabilizer column to one or more of the HPPT separator, the LPPT separator, the dehydrator, and the desalter to (1) reduce or eliminate an amount of demulsifier chemical being introduced into the flow pipe, (2) remove adhered particles from one or both of the dehydrator coalescing grids and the desalter coalescing grids, or (3) a combination of (1) and (2).

2. The system of claim 1, wherein a recirculation flowline extends between the stabilizer column and the HPPT.

3. The system of claim 1, wherein a recirculation flowline extends between the stabilizer column and the LPPT.

4. The system of claim 1, wherein a recirculation flowline extends between the stabilizer column and both the HPPT and the LPPT.

5. The system of claim 1, wherein a recirculation flowline extends between the stabilizer column and (1) the dehydrator or (2) the desalter.

6. The system of claim 1, wherein a recirculation flowline extends between the stabilization column and both the dehydrator and the desalter.

7. The system of claim 1, wherein the dehydrator and the desalter further comprise interior lines under the dehydrator coalescing grids and the desalter coalescing grids, respectively by 50 mm and each include one or more nozzles for emitting recirculated stabilized hot crude oil, wherein the one or more nozzles are high pressure nozzles that control the pressure drop within the interior lines to atomize and spray the recirculated stabilized hot crude oil into the dehydrator and/or the desalter coalescing grids, or to atomize and spray recirculated desalted crude oil from the desalter into the dehydrator after heating with a heater.

8. The system of claim 1, further comprising an additional recirculation flowline that extends between the desalter and the LPPT for recirculating a desalted cold crude oil from the desalter to the LPPT, and further comprising a heater interposing the desalter and the LPPT for heating contents of the additional recirculation flowline.

9. The system of claim 1, further comprising an additional recirculation flowline that extends between the desalter and both the HPPT and the LPPT for recirculating a desalted cold crude oil from the desalter to the HPPT and the LPPT, and further comprising a heater interposing the desalter and both the HPPT and the LPPT for heating contents of the additional recirculation flowline.

10. The system of claim 1, further comprising an additional recirculation flowline that extends between the desalter and the HPPT for recirculating a desalted cold crude oil from the desalter to the HPPT, and further comprising a heater interposing the desalter and the HPPT for heating contents of the additional recirculation flowline.

11. The system of claim 1, further comprising an additional recirculation flowline that extends between the desalter and the dehydrator, and further comprising a heater interposing the desalter and the dehydrator for heating contents of the additional recirculation flowline.

12. A method comprising:
   providing a gas-oil separation plant system comprising:
      a high pressure production trap (HPPT) separator;
      a low pressure production trap (LPPT) separator in fluid communication with the HPPT separator;
      a dehydrator in fluid communication with the LPPT separator;
      a desalter in fluid communication with the dehydrator;
      a stabilizer column in fluid communication with the desalter;
         wherein a flowline interposes the LPPT separator and the dehydrator for introduction of a demulsifier chemical to the dehydrator, and
         wherein an emulsified crude is circulated between the HPPT separator, the LPPT separator, the dehydrator, the desalter, and the stabilizer column for separation of liquid hydrocarbons and saline water therefrom; and
      one or more recirculation flowlines for recirculating the emulsified crude or liquid hydrocarbons between one or more of the HPPT separator, the LPPT separator, the dehydrator, the desalter, and the stabilizer column to reduce or eliminate an amount of demulsifier chemical being introduced from the demulsifier flowline; and
   recirculating the emulsified crude or liquid hydrocarbons between one or more of the HPPT separator, the LPPT separator, the dehydrator, the desalter, and the stabilizer column within the one or more recirculation flowlines.

13. The method of claim 12, wherein a recirculation flowline extends between the stabilizer column and the HPPT.

14. The method of claim 12, wherein a recirculation flowline extends between the stabilizer column and the LPPT.

15. The method of claim 12, wherein a recirculation flowline extends between the stabilizer column and both the HPPT and the LPPT.

16. The method of claim 12, wherein a recirculation flowline extends between the desalter and the HPPT, and further comprising a heater interposing the desalter and the HPPT for heating contents of the recirculation flowing.

17. The method of claim 12, wherein a recirculation flowline extends between the desalter and the LPPT, and further comprising a heater interposing the desalter and the LPPT for heating contents of the recirculation flowline.

18. The method of claim 12, wherein a recirculation flowline extends between the desalter and both the HPPT and the LPPT, and further comprising a heather interposing the desalter and both the HPPT and the LPPT for heating contents of the recirculation flowline.

19. The method of claim 12, wherein a recirculation flowline extends between the stabilizer column and the dehydrator.

20. The method of claim 12, wherein a recirculation flowline extends between the stabilizer column and both the dehydrator and the desalter.

21. The method of claim 12, wherein a recirculation flowline extends between the desalter and the dehydrator, and further comprising a heater interposing the desalter and the dehydrator for heating contents of the recirculation flowline.

\* \* \* \* \*